Willard and Ross,
Mower.
No. 1775 Reissued Sep. 27. 1864.
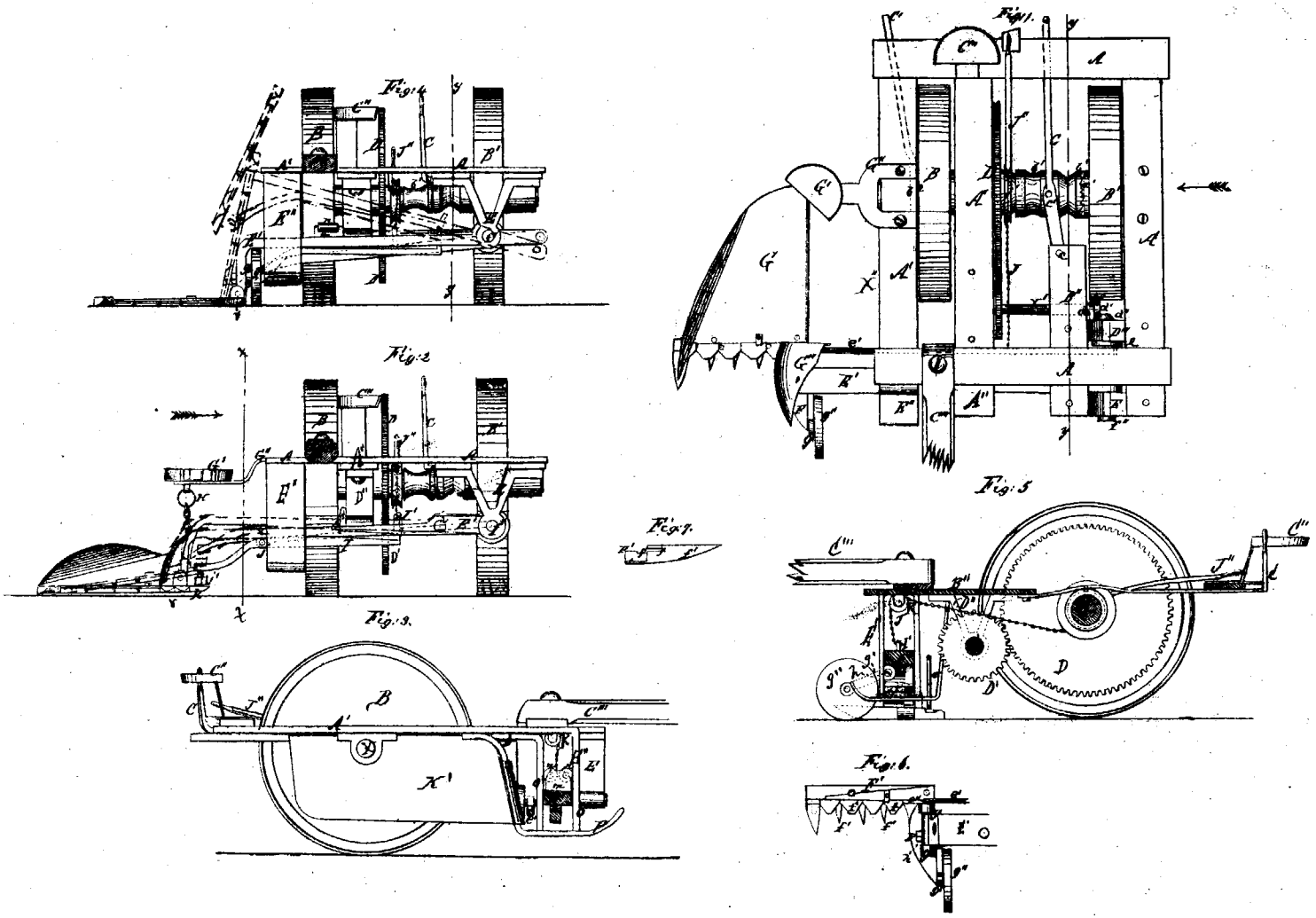
James A. Shipton,
By his Attorney
Thos. G. Dodge
Witnesses { J. Henry Hill
Eliza B. Dodge

UNITED STATES PATENT OFFICE.

JAMES A. SAXTON, OF CANTON, OHIO, ASSIGNEE, BY MESNE ASSIGNMENTS, OF HOSEA WILLARD AND ROBT. ROSS.

IMPROVEMENT IN HARVESTERS.

Specification forming part of Letters Patent No. 18,562, dated November 3, 1857; Reissue No. 1,775, dated September 27, 1864.

*To all whom it may concern:*

Be it known that HOSEA WILLARD, of Vergennes, in the county of Addison and State of Vermont, and ROBERT ROSS, formerly of same place, but now residing at St. Albans, in the county of Franklin, in said State, invented certain new and useful Improvements in Grain and Grass Harvesting Machines, of which the following is a full, clear, and exact description, reference being had to the accompanying drawings, which make a part of this specification, and in which—

Figure 1 is a plan or top view showing one mode of applying said improvements when the machine is to be used as a reaper. Fig. 2 represents a front view of Fig. 1, with the leading-wheel removed to show the parts in rear of it more fully, the coupling-arm, finger-beam, and platform being shown in different positions, but, as will be hereinafter explained, to illustrate the flexible connection of the finger-beam with the machine. Fig. 3 represents a section and side view on line *x x*, Fig. 2, when the parts are in the position shown in black lines. Fig. 4 represents in black lines a front view of the machine when arranged for mowing, and in blue and red lines two of the different positions which the finger-beam and cutting apparatus are made to assume when being prepared or folded for transportation. Fig. 5 represents a section on lines *y y*, Figs. 1 and 4, when the machine is arranged for mowing, as shown in black lines, Fig. 4. Fig. 6 represents a plan or top view of finger bar or beam F′, shoe F, leading-wheel *g″*, and part of the coupling-arm or finger-bar extension-piece E′; and Fig. 7 represents a side view of one of the fingers and an end or cross section of the finger bar or beam, showing how a part of the finger is made to rise up by the front edge of the bar to keep the cutter-bar from working forward.

The side of the machine which runs next to the standing grain I call the "inside," and that which runs next to the cut grass or grain I call the "outside."

In the accompanying drawings, the main frame, which is of rectangular form, is represented by the letters A A A′ A′. To the under side of the parts A′ A′ are fastened the bearings of the main shaft or journal of the driving and supporting wheels B B′. To the inner hub of the latter is fastened a ratchet wheel or device, *a′*, while a similar ratchet device, *a*, is fastened to the outer hub or side of wheel B. Wheels B B′, with their hub-ratchets, are fitted loosely on shaft X. A sliding ratchet wheel or device, *b′*, works on shaft X, and is so connected therewith as to be revolved when said shaft revolves, but is susceptible of a lateral movement, so that it can be moved in and out of action with ratchet *a′* by means of pin *c′* in lever C, whose front end is pivoted to the under side of piece B″, fastened to the front of the frame. Pin *c′* fits into a groove turned in the part *b′*, so that the part *b′* operates like a sliding revolving clutch. A similar ratchet or clutch, *b*, is fitted to be worked by lever C′ on the outside of wheel B.

C″ is the driver's seat, which is fastened to the rear of main frame, and in such a position as that levers C and C′ are both within his reach.

As the machine is drawn forward by tongue C‴ (shown in section) wheels B B′ revolve, and when both or either of the clutches *b b′* are in action with their respective ratchets *a a′*, shaft X is caused to revolve, together with cog-wheel D, fastened thereto, and which gears into cog-wheel D′ on a shaft, X′, supported at one end by hanger D″, depending from piece A″, and at the other in a projection, *d*, from hanger B‴, in which the short crank-shaft turns, the latter having on its rear end a bevel-gear, *d″*, which is operated by bevel-gear *d′* on the end of shaft X′.

On the front end of the crank-shaft is fitted a balance-wheel, *e*, with a crank-pin, upon which is placed the outer end of the pitman *e′*, which gives motion to the cutter-bar *e″*, to which are attached teeth *f*, which work as they vibrate through slotted open fingers *f′*. The ratchet-teeth are so made that when the machine is backed wheels B B′ do not give motion to shaft X. Again, owing to this construction, the machine can be turned either to the right or left, and still the cutters be operated, the wheels being independent drivers. When the driver wishes he can, by means of levers C C′, throw both or either of the wheels out of action, and which is necessary when passing from field to field or over cut grass.

From the front outer corner of the main frame depends hanger E, through which passes a journal, $f''$, upon which the outer end of the coupling-arm E′ turns as a hinge. The coupling-arm extends across under the front of the frame, through loop E″, and then bends down, as fully shown in Figs. 2 and 4, and is hinged between ears $g$ $g$, which rise up from shoe F, to which the heel of finger-beam F′ is fastened. (See Fig. 6.)

The cutter-bar $e'$ rests and works on the front edge of the finger-beam F′, while the fingers are so constructed as to project up a little above the surface of the finger-beam when in place, thereby affording a guide against which the cutter-bar works, as shown in Fig. 7.

When the machine is to be used as a reaper the front of a grain-platform, G, is fastened to the rear top of finger-beam F′, while its rear end is suspended by a chain or other equivalent device to a projecting arm, G‴, which also supports the raker's seat G′, the finger-beam and platform being adjusted to the proper height, which can be done by applying any of the well-known devices commonly used for such a purpose to the outer end of the finger-beam, in combination with the adjustable leading-wheel $g''$ and chain H, leading-wheel $g''$ being journaled to the front end of arm $g'$, whose rear end is fastened to the under curved side of the coupling-arm E by an adjusting bolt and nut, $h$, so that wheel $g''$ can be made to support the heel of finger-beam F′ at any desired height. When a sufficient quantity of grain has accumulated upon platform G the raker, from his seat G′, removes the gavel and deposits it upon the ground through the open space X″.

G‴ is a shield or cover-piece, which is sometimes attached to the curved or bent end of the coupling-arm E, when the machine is to be used as a reaper, in order to guard the heel of the cutter-bar and joint of the coupling-arm more securely from clogging and injury. This shield, however, does not interfere with the necessary flexibility of the grain-platform, since the side next the machine can rise up, as shown in red lines, Fig. 2, or the other side can rise up to conform to the irregularities of the ground, independent of the up and down motions of the main frame. The entire platform and finger-beam can also rise up bodily to pass over elevations. It will thus be seen that when used as a reaper the ground platform has a free up-and-down as well as a lateral rolling motion, independent of the up-and-down motion of the main frame.

In case of necessity the finger-beam and parts connected therewith can be raised up bodily by the driver. This operation is effected as follows: To the under side of the coupling-arm E′ a lever, I, is pivoted or hinged, as seen at $j$, the connection in this instance being formed by projecting a short pendant-piece down from the under side of the coupling-arm E′ into a mortise in the lever I, and then inserting a pin through lever I and the pendant in such a manner as to allow lever I to rock up and down on pin $j$ as a center. To the rear end of lever I are attached two uprights or projections, I′ I′, which pass through holes made in coupling-arm E′, and having holes in their upper end, as indicated in the drawings.

When the machine is used as a reaper the outer upright, I′, comes directly under a chain, rope, or other equivalent device, J, and to the end of which it is securely fastened in any convenient manner. Said connection J then passes up over a roller or sheave, K, attached or suspended from the under side of the main frame, thence back, and is fastened to a pulley, J′, loose on shaft X, but having a conical end projecting into a similar concavity in the end of clutch $b'$, as indicated in dotted lines in Fig. 1. A lever, J″, is also fastened to pulley J, and extends back within reach of the driver when in his seat C″. It will now be seen that if the driver turns lever J″ up toward the front of the machine chain J will be wound up, and the end of lever I, striking against the under side of coupling-arm E′, causes that to turn upon its hinge $f''$, while the end of an adjusting nut or bolt, $j'$, in the curved end of lever I strikes against a knuckle, $k$, which projects from the end of the heel of the finger-beam or shoe, which supports the heel of the finger-beam in between the lugs $g$ $g$, to which the coupling-arm E′ is hinged, so that as soon as any power is applied to lever I to raise the coupling-arm E′ the joint of the coupling-arm is rendered rigid in a downward direction, whereby as the coupling-arm is raised the finger-beam is also raised in nearly a horizontal position, knuckle $k$ and adjusting-nut $j'$ uniting to prevent the outer end of the finger-beam falling below the heel end. As the raising of the cutting apparatus requires considerable power, the driver, by pushing the conical part of pulley J′ against the concave part of clutch $b'$, can cause the power of the team to assist him in the operation of raising the cutting apparatus by the friction between the two surfaces. This the driver can do by means of lever J″.

A shield, K, is attached to the inside of the machine, when used as a reaper, to keep the grain from falling against or under wheel B when raked off.

To change the machine to a mower, as seen in Figs. 4 and 5, platform G is removed, coupling-arm E′ slipped back, so as to bring hole $i$ in a position to receive journal $f''$, and the finger-beam lowered down, so as to rest on the ground, and chain or cord J attached to the inner upright, I′, when the machine is ready for cutting grass, as indicated in black lines, Fig. 4.

It will be observed that coupling-arm E′ has two supports, one at $f''$, where it is hinged, and the other where it passes through loop E″, which is formed by parallel pieces $o$ $o$, made fast to the front inner corner of the main frame and united at bottom by a sort of shoe or shield-piece, *p*, the rear upper end of which is fastened to the under side of the main frame. The rear of piece *p* also serves as a front support to the shield-piece K.

If found desirable, a black piece, *m*, with friction-rolls *n n*, may be fastened to the top of coupling-arm E′, where it passes through loop E″, to lessen the friction against the sides of the loop when the coupling-arm rises or falls.

The raker's seat G′ being placed nearly over the axial line of the main supporting-wheels, the balance of the machine is not seriously affected by his weight or that of the platform when the machine is used as a reaper, as will readily appear from an examination of the drawings. In the drawings a finger-beam of only such length is represented as was deemed necessary to illustrate the invention and operation of the machine.

In constructing machines the skill and judgment of the constructer will be sufficient to enable the various parts of the invention to be applied to different reaping and mowing machines in use, so far as it is applicable, and it is obvious that some of the improvement, can be applied to other mowing and reaping machines in use, one practical mode of applying said improvements to use, however, having been described and shown in this machine.

What is claimed under this patent as the invention of said WILLARD and ROSS, is—

1. The combination of the grain-platform G, or its equivalent, with a hinged coupling-arm, E′, and a rear connection which allows of an up motion of the platform independent of the main frame, substantially as described.

2. Supporting the rear delivery side of the platform G, or its equivalent, by a yielding connection from the main frame, in combination with supporting the front delivery side by a leading-wheel, *g″*, or its equivalent, substantially as described.

3. The combination of the rear of the grain-platform, raker's seat G, and arm G‴, or its equivalent, with the inner side of the main frame, substantially as set forth.

4. Connecting the front of a grain-platform of a two-wheel harvesting-machine to a finger-beam, which is in turn hinged by a free hinge to a hinged coupling-arm, whereby the platform is free to conform to the inequalities of the ground, substantially as set forth and described.

5. The combination of the independent supporting and driving wheels B B′, with ratchets *b b′*, levers C C′, gears D D′ and *d′ d″*, substantially as and for the purposes set forth.

6. The combination of convex pulley J′ with concave ratchet-wheel *b′*, substantially as set forth.

In witness whereof I have hereunto signed my name.

JAMES A. SAXTON.

In presence of—
GEO. E. BALDWIN,
S. SURBURG.